US010089502B2

(12) United States Patent
Kato et al.

(10) Patent No.: US 10,089,502 B2
(45) Date of Patent: *Oct. 2, 2018

(54) METHOD FOR DETERMINING EXISTENCE OF WIDEBAND IMPEDANCE MATCHING CIRCUIT IN A WIRELESS IC DEVICE SYSTEM

(71) Applicant: Murata Manufacturing Co., Ltd., Nagaokakyo-shi, Kyoto-fu (JP)

(72) Inventors: Noboru Kato, Nagaokakyo (JP); Satoshi Ishino, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/986,771

(22) Filed: Jan. 4, 2016

(65) Prior Publication Data

US 2016/0117531 A1 Apr. 28, 2016

Related U.S. Application Data

(63) Continuation of application No. 12/940,105, filed on Nov. 5, 2010, now Pat. No. 9,281,873, which is a (Continued)

(30) Foreign Application Priority Data

May 26, 2008 (JP) ................................ 2008-136859

(51) Int. Cl.
*G06K 7/00* (2006.01)
*G06K 7/10* (2006.01)
(Continued)

(52) U.S. Cl.
CPC ....... *G06K 7/10148* (2013.01); *G06K 7/0008* (2013.01); *G06K 7/10306* (2013.01);
(Continued)

(58) Field of Classification Search
CPC ............. G06K 7/0008; G06K 7/10148; G06K 7/10306; G06K 19/0723; G06K 19/0724;
(Continued)

(56) References Cited

U.S. PATENT DOCUMENTS 6,802,659 B2 * 10/2004 Cremon ..................... B41J 5/30
400/61
7,091,860 B2 * 8/2006 Martinez de Velasco Cortina .....
G06K 19/0723
340/10.1

(Continued)

FOREIGN PATENT DOCUMENTS

EP 2157828 A1 * 2/2010 ............ H04W 24/00

OTHER PUBLICATIONS

Kato et al., "Wireless IC Device System and Method of Determining Authenticity of Wireless IC Device", U.S. Appl. No. 12/940,105, filed Nov. 5, 2010.

*Primary Examiner* — Quan-Zhen Wang
*Assistant Examiner* — Stephen Burgdorf
(74) *Attorney, Agent, or Firm* — Keating & Bennett, LLP

(57) ABSTRACT

An accessory device to be mounted on a main device is provided with a wireless IC device. The main device is provided with a reader/writer that is an interrogator that communicates with the wireless IC device of the accessory device. When the accessory device is mounted on or about to be mounted on the main device, the reader/writer selects two or more frequencies in a frequency band in which an authentic wireless IC device can communicate to perform communication with the wireless IC device. With this configuration, even if the identification code written in an RFID tag is read and the RFID tag is duplicated, the duplicated RFID tag can be accurately and effectively determined as being counterfeit.

4 Claims, 7 Drawing Sheets

Related U.S. Application Data continuation of application No. PCT/JP2009/056934, filed on Apr. 3, 2009.

(51) Int. Cl.
  *G06K 19/07* (2006.01)
  *G06K 19/077* (2006.01)
  *H04B 5/00* (2006.01)

(52) U.S. Cl.
  CPC ..... *G06K 19/0723* (2013.01); *G06K 19/0724* (2013.01); *G06K 19/07786* (2013.01); *H04B 5/0075* (2013.01)

(58) Field of Classification Search
  CPC ......... G06K 19/0726; G06K 19/07749; G06K 19/07786; H01Q 1/2225; H01Q 1/38; H01Q 7/00; H04B 5/0012; H04B 5/0075; H04B 5/02
  USPC ........................................................ 340/10.1
  See application file for complete search history.

(56) References Cited

U.S. PATENT DOCUMENTS

| | | | | |
|---|---|---|---|---|
| 7,257,504 | B2* | 8/2007 | Bolander | G06K 7/10059 324/762.03 |
| 7,817,044 | B2* | 10/2010 | Posamentier | G06K 19/0701 340/10.1 |
| 7,953,368 | B2* | 5/2011 | Miwa | G06K 19/0723 257/728 |
| 8,947,209 | B2* | 2/2015 | Hsieh | G06K 7/0008 340/10.1 |
| 2004/0235428 | A1* | 11/2004 | Nagai | G06K 7/0008 455/85 |
| 2005/0040242 | A1* | 2/2005 | Beenau | G06K 7/0008 235/492 |
| 2005/0093761 | A1* | 5/2005 | King | G06K 19/07749 343/873 |
| 2006/0068701 | A1* | 3/2006 | Chapman | G06K 7/10465 455/41.1 |
| 2006/0158316 | A1* | 7/2006 | Eckstein | G08B 13/2414 340/10.42 |
| 2007/0046559 | A1* | 3/2007 | Youn | G06K 19/0723 343/862 |
| 2007/0236336 | A1* | 10/2007 | Borcherding | G06K 7/0008 340/10.34 |
| 2007/0262866 | A1* | 11/2007 | Eveland | H01Q 9/28 340/572.7 |
| 2007/0290928 | A1* | 12/2007 | Chang | G06K 19/07786 343/700 MS |
| 2008/0020714 | A1* | 1/2008 | Mezhinsky | A61B 90/90 455/73 |
| 2008/0143620 | A1* | 6/2008 | Khatri | H01Q 7/00 343/726 |
| 2008/0266191 | A1* | 10/2008 | Hilgers | H01Q 1/2225 343/726 |
| 2009/0134973 | A1* | 5/2009 | Sandler | G06F 21/85 340/10.1 |
| 2009/0257474 | A1* | 10/2009 | Tuttle | H04B 1/713 375/133 |

* cited by examiner

FIG. 3
100
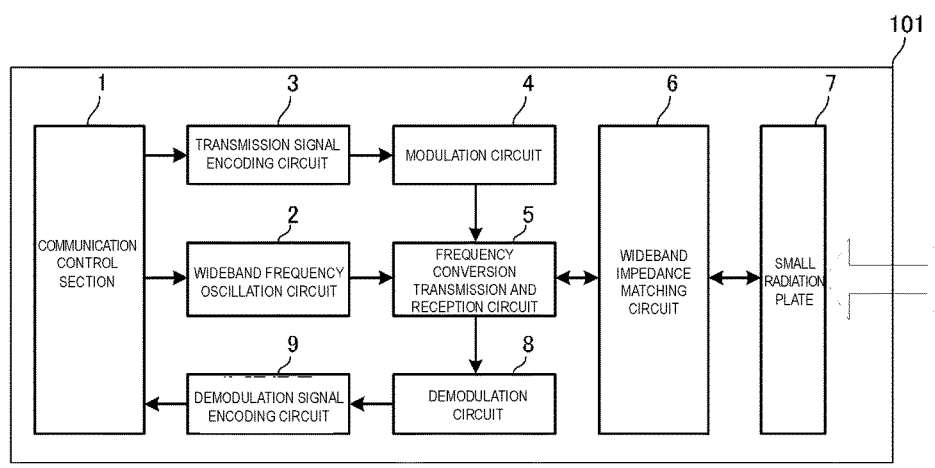
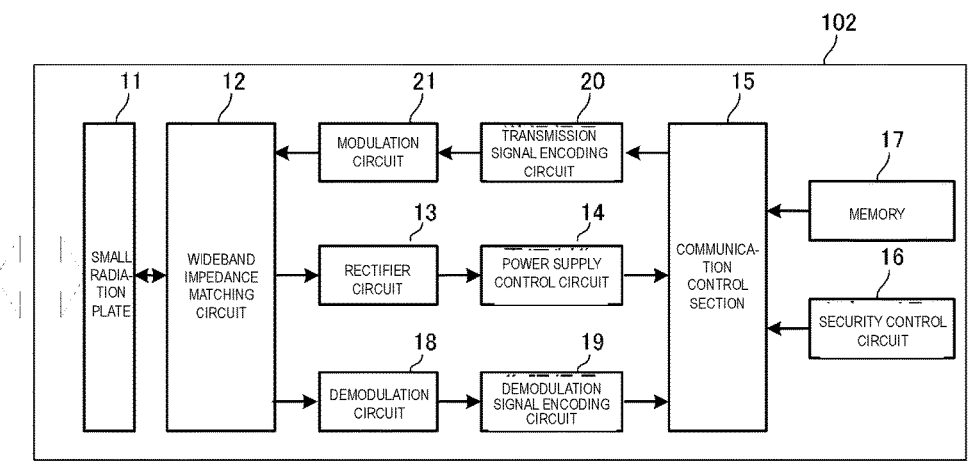

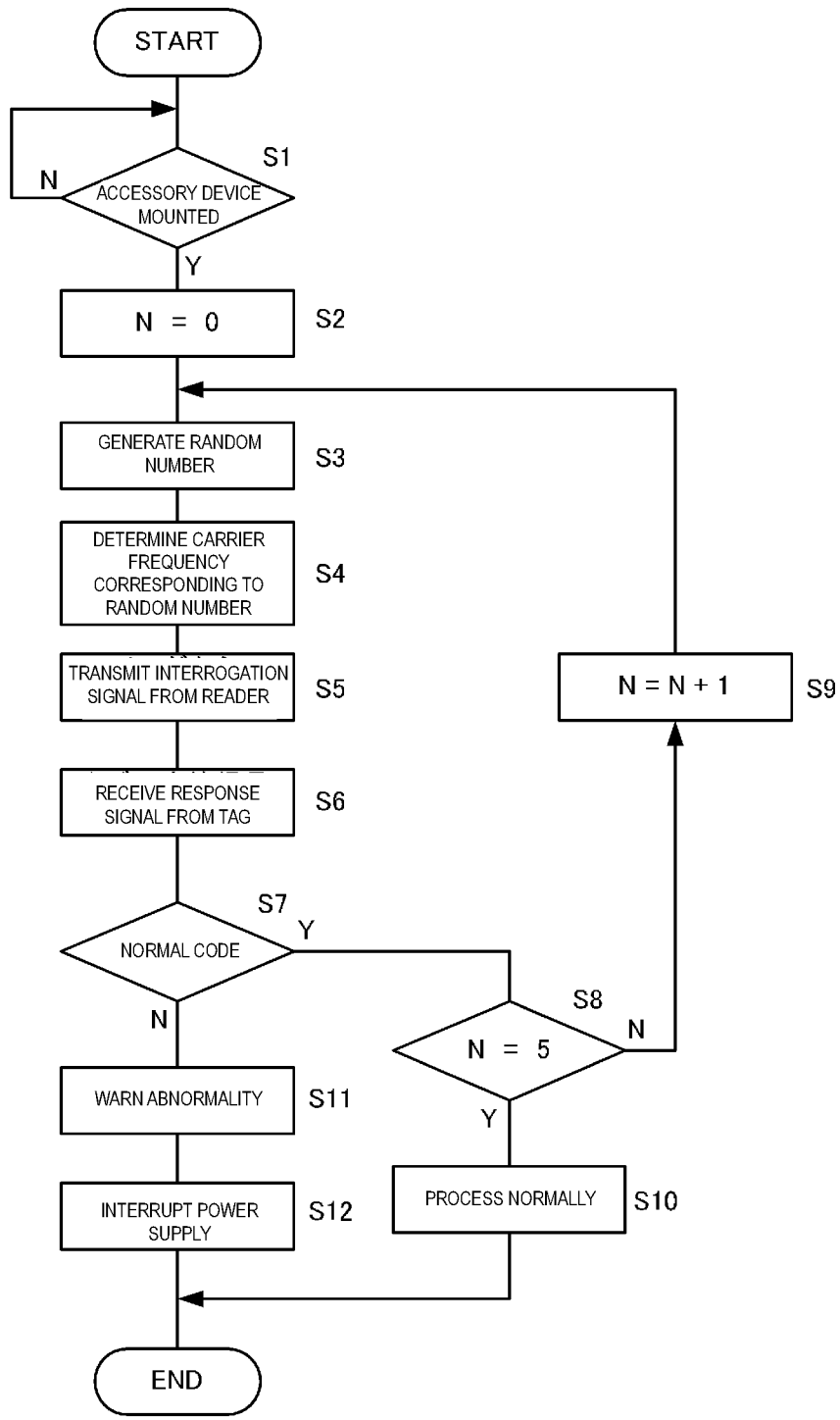

METHOD FOR DETERMINING EXISTENCE OF WIDEBAND IMPEDANCE MATCHING CIRCUIT IN A WIRELESS IC DEVICE SYSTEM

BACKGROUND OF THE INVENTION

1. Field of the Invention

The present invention relates to a wireless IC device system that determines the authenticity of an article by using an RFID tag and a method therefor.

2. Description of the Related Art

Japanese Unexamined Patent Application Publication No. 2007-150642 describes a wireless tag (RFID tag) that is used for physical distribution management and/or for authenticity determination. The wireless tag of Japanese Unexamined Patent Application Publication No. 2007-150642 was developed to solve a conventional problem in that since the frequency band in which communication is possible is narrow and the frequency of a communicatable signal varies due to manufacturing variations or the surrounding environment of the wireless tag, communication failure with an interrogator (reader/writer) occurs. Consequently, the wireless tag of Japanese Unexamined Patent Application Publication No. 2007-150642 is configured such that authentication of an article is performed by changing the frequency of a signal using the interrogator to find a frequency at which communication is possible.

FIG. 1 is a block diagram illustrating a configuration of a control logic circuit 110 in the interrogator.

The control logic circuit 110 includes a PLL control section 301, a transmission signal generation section 302, a reception signal processing section 303, a transmission and reception control section 304, a storage section (hopping channel-wireless tag ID storage table) 305, and an external interface section 306.

The storage section 305 stores the relationship between a wireless tag ID and a frequency changing channel (carrier frequency) to which the wireless tag responds. The PLL control section 301 controls carrier frequencies.

Meanwhile, Japanese Unexamined Patent Application Publication No. 2005-345802 discloses a configuration that includes an electronic equipment main body (camera) and a removable unit. The unit is provided with an information communication chip that stores identification information and other information, and an antenna. The electronic equipment main body (camera) includes an antenna and a device arranged to read information, and further includes a controller arranged to control operations with the unit based on read information.

RFID tags are normally provided on articles to determine authenticity. However, data written in an RFID tag can be read by analyzing the inside of the RFID tag, and thus, duplication of the RFID is technically possible. Even when the system described in Japanese Unexamined Patent Application Publication No. 2007-150642 is used, the authentication process is performed using only a certain frequency in a frequency band in which communication is possible. Consequently, when a counterfeit wireless tag having the same identification code is attached to an article, the article is falsely determined to be authentic.

Further, in the wireless tag system described in Japanese Unexamined Patent Application Publication No. 2007-150642, when a wireless tag is used that has a tuning frequency outside the range over which communication is possible for the interrogator, there is a problem in that trimming of the antenna pattern is required, thereby increasing the cost due to an increase in the number of processes.

Furthermore, in the device of Japanese Unexamined Patent Application Publication No. 2005-345802, the electronic equipment initiates normal operation even with a unit of an inferior imitation product if the identification code of the RFID tag matches, whereby the electronic equipment main body may be damaged. Even if the identification code of the RFID tag of the removable unit is encrypted, the encryption algorithm and the encryption key can be determined by analyzing the IC, and thus, duplication/fabrication of the RFID is possible. Therefore, although the authentication determination using RFID tags may be effective to prevent improper use, since encryption can be analyzed easily in an environment in which proper consumable items as well as electronic equipment main bodies are sold together, it is difficult to fully prevent improper use.

SUMMARY OF THE INVENTION

To overcome the problems described above, preferred embodiments of the present invention provide a wireless IC device system that can, even if the identification code written in an RFID tag is read and the RFID tag is duplicated, accurately determine that the duplicated RFID tag is counterfeit, and an authenticity determination method therefor.

A wireless IC device system according to a preferred embodiment of the present invention includes a wireless IC device for an RFID tag, and an interrogator that communicates with the wireless IC device.

The interrogator preferably includes a circuit that randomly selects a frequency at which communication is to be performed from a frequency band of the wireless IC device in which communication is possible to communicate with the wireless IC device, and a circuit that performs authenticity determination of the wireless IC device by determining whether or not communication is possible at the frequency.

Compared with an authentic wireless IC device, a counterfeit RFID tag has a very narrow frequency band in which communication is possible. Therefore, with the configuration described above, communication is disabled unless a randomly selected frequency incidentally matches a frequency at which the counterfeit RFID tag can communicate. This enables accurate authenticity determination of wireless IC devices.

The interrogator preferably selects two or more frequencies at which communication is to be performed. With this configuration, it is possible to accurately reject a counterfeit device in which multiple target communication frequencies have been set in advance.

The frequency band of the wireless IC device and the interrogator in which communication is possible is preferably wider than a frequency band that is used for the RFID tag, and authenticity determination is performed by determining whether or not communication is possible at a frequency other than one included in the frequency band that is used for the RFID tag.

For example, since frequencies used for RFID tags differ among Japan, Europe, and the U.S., authenticity determination is performed in Japan by attempting to use the interrogator to communicate with the RFID tag using a frequency used for RFID tags in Europe, for example, and by determining whether or not the communication is possible at the frequency.

With this configuration, when a frequency is randomly selected, a frequency at which a counterfeit RFID tag can communicate is not inadvertently selected, and thus, more secured authenticity determination is performed.

The interrogator is preferably provided on a main device, and the wireless IC device is provided on an accessory device that is connected to or mounted on the main device.

The main device is preferably provided with a warning circuit that issues a warning signal when it is determined in the authenticity determination that the wireless IC device is not authentic.

With this configuration, when the accessory device is mounted or about to be mounted on the main device, the authenticity of the accessory device is determined, whereby a counterfeit accessory device is prevented from being used.

The interrogator is preferably provided on a main device, and the wireless IC device is provided on an accessory device that is connected to or mounted on the main device.

A circuit element is preferably provided that terminates or limits an operation of the main device when it is determined in the authenticity determination that the wireless IC device is not authentic.

With this configuration, a counterfeit accessory device is effectively prevented from being used, and breakage and/or damage to the main device are also prevented.

The frequency band of the wireless IC device in which communication is possible is preferably in a range of approximately five times to approximately 1000 times that of a carrier frequency band of a communication signal used by the RFID tag, for example.

With such a frequency band, even if the entire frequency band that the interrogator may use is covered, at least five counterfeit RFID tags, each having a different communication frequency, are needed to be provided on a counterfeit accessory device, and this is not realistic. Therefore, a deterrent effect on counterfeit tags is provided.

In a method of determining the authenticity of a wireless IC device according to a preferred embodiment of the present invention in which a wireless IC device system including a wireless IC device for an RFID tag and an interrogator that communicates with the wireless IC device is provided, a frequency at which communication is to be performed is randomly selected using the interrogator from a frequency band of the wireless IC device in which communication is possible to communicate with the wireless IC device, and authenticity determination of the wireless IC device is performed by determining whether or not communication is possible at the selected frequency.

The interrogator preferably selects two or more frequencies at which communication is to be performed.

The frequency band of the wireless IC device and the interrogator in which communication is possible is preferably wider than a frequency band that is used for the RFID tag, and the authenticity determination of the wireless IC device is performed by determining whether or not communication is possible at a frequency other than one included in the frequency band that is used for the RFID tag.

According to various preferred embodiments of the present invention, the determination between authentic wireless IC devices and counterfeit wireless IC devices can be effectively and accurately performed.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 3 is a block diagram illustrating respective configurations of a wireless IC device and a reader/writer according to a preferred embodiment of the present invention.

FIG. 7 is a flowchart illustrating a processing procedure of a main device control circuit in the main device shown in FIG. 6A.

DETAILED DESCRIPTION OF THE PREFERRED EMBODIMENTS

First Preferred Embodiment

A wireless IC device system and a method of determining the authenticity of a wireless IC device according to a first preferred embodiment will be described with reference to drawings.

Figure 1:
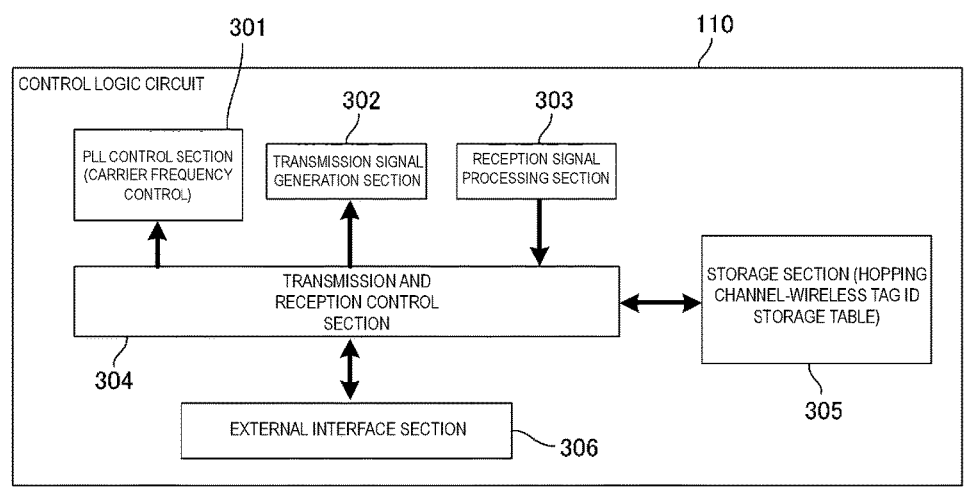
FIG. 1 is a block diagram of a control logic circuit of an interrogator disclosed in Japanese Unexamined Patent Application Publication No. 2007-150642.
Figure 2:
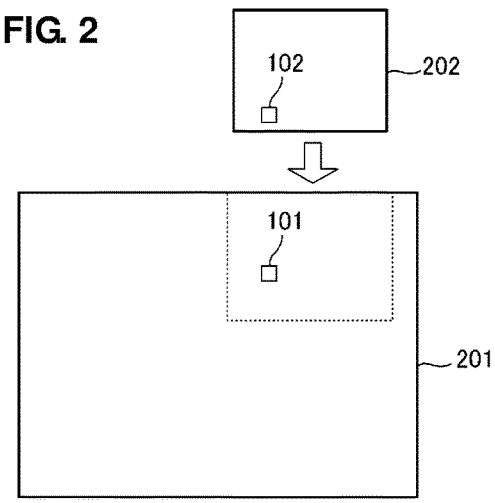
FIG. 2 is a block diagram of a system including a main device to which a wireless IC device system according to a preferred embodiment of the present invention is applied and an accessory device thereof.

FIG. 2 is a block diagram of a system including a main device 201 to which a wireless IC device system according to the first preferred embodiment of the present invention is applied and an accessory device 202 thereof. The accessory device 202 is provided with a wireless IC device 102. The main device 201 is provided with a reader/writer 101 that is an interrogator that communicates with the wireless IC device 102 of the accessory device 202.

The main device 201 and the accessory device 202 provide predetermined functions when the accessory device 202 is connected to or mounted on the main device 201. For example, when the main device 201 is a printer, the accessory device 202 is an ink cartridge. When the main device 201 is a video game machine, the accessory device 202 is video game software, i.e., a cartridge, a disk, or other suitable software. When the main device 201 is a DVD player, the accessory device 202 is DVD software, i.e. a disk. When the main device 201 is a camera, the accessory device 202 is an interchangeable lens thereof.

When the accessory device 202 is mounted or about to be mounted, the main device 201 determines whether the wireless IC device 102 is an authentic wireless IC device (RFID tag), (hereinafter simply referred to as "real", that is, the main device 201 determines whether the accessory device 202 including the wireless IC device 102 is real or counterfeit.

FIG. 3 is a block diagram illustrating respective configurations of the wireless IC device 102 and the reader/writer 101. In the reader/writer 101, a communication control section 1 controls a wideband frequency oscillation circuit 2 and a transmission signal encoding circuit 3 to initiate communication or control the transmission of communication signals. That is, the wideband frequency oscillation circuit 2 outputs an oscillation signal to a frequency conversion transmission and reception circuit 5 and a modulation circuit 4 modulates a transmission signal frequency output from the frequency conversion transmission and reception circuit 5 in accordance with a data string output from the transmission signal encoding circuit 3.

A wideband impedance matching circuit 6 matches the impedance between the frequency conversion transmission and reception circuit 5 and a small radiation plate 7 over a wide band. A transmission signal output from the frequency conversion transmission and reception circuit 5 is transmitted as an electromagnetic wave from the small radiation plate 7 via the wideband impedance matching circuit 6.

In addition, a modulation signal, which will be described later, from the wireless IC device 102 is demodulated by a demodulation circuit 8 and a demodulation signal encoding circuit 9 converts the signal into a digital data string and provides it to the communication control section 1. The communication control section 1 performs reading of the identification code of the wireless IC device 102 and communication control based on the encoded data.

Meanwhile, in the wireless IC device 102, a small radiation plate 11 receives the electromagnetic wave transmitted from the reader/writer 101 and provides it as a power signal to a rectifier circuit 13 via a wideband impedance matching circuit 12. The rectifier circuit 13 rectifies the received electromagnetic wave, and a power supply control circuit 14 provides the voltage rectified by the rectifier circuit 13 as a power supply to a communication control section 15.

The communication control section 15 transmits based on data written to or having been written in advance in a memory 17, generates data, and, on the basis thereof, controls a transmission signal encoding circuit 20. The transmission signal encoding circuit 20 drives a modulation circuit 21 to modulate the electromagnetic wave transmitted from the reader/writer 101, and, after matching with the impedance of an external space is performed by the wideband impedance matching circuit 12, the transmission signal encoding circuit 20 transmits the communication signal from the small radiation plate 11.

A demodulation circuit 18 demodulates the electromagnetic wave transmitted from the reader/writer 101, and a demodulation signal encoding circuit 19 converts it into a digital data string and provides the digital data string to the communication control section 15. The communication control section 15 performs a predetermined communication control, such as returning the identification code, for example, on the basis of the encoded transmission data from the reader/writer 101. As a security control circuit 16, a DES encryption circuit or an RSA encryption circuit, for example, is preferably used.

Figure 4:
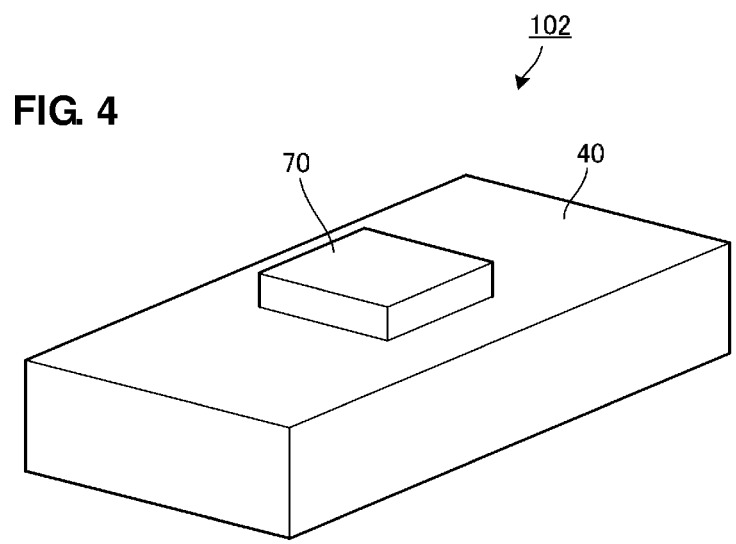
FIG. 4 is a perspective view of the wireless IC device shown in FIG. 3.
Figure 5:
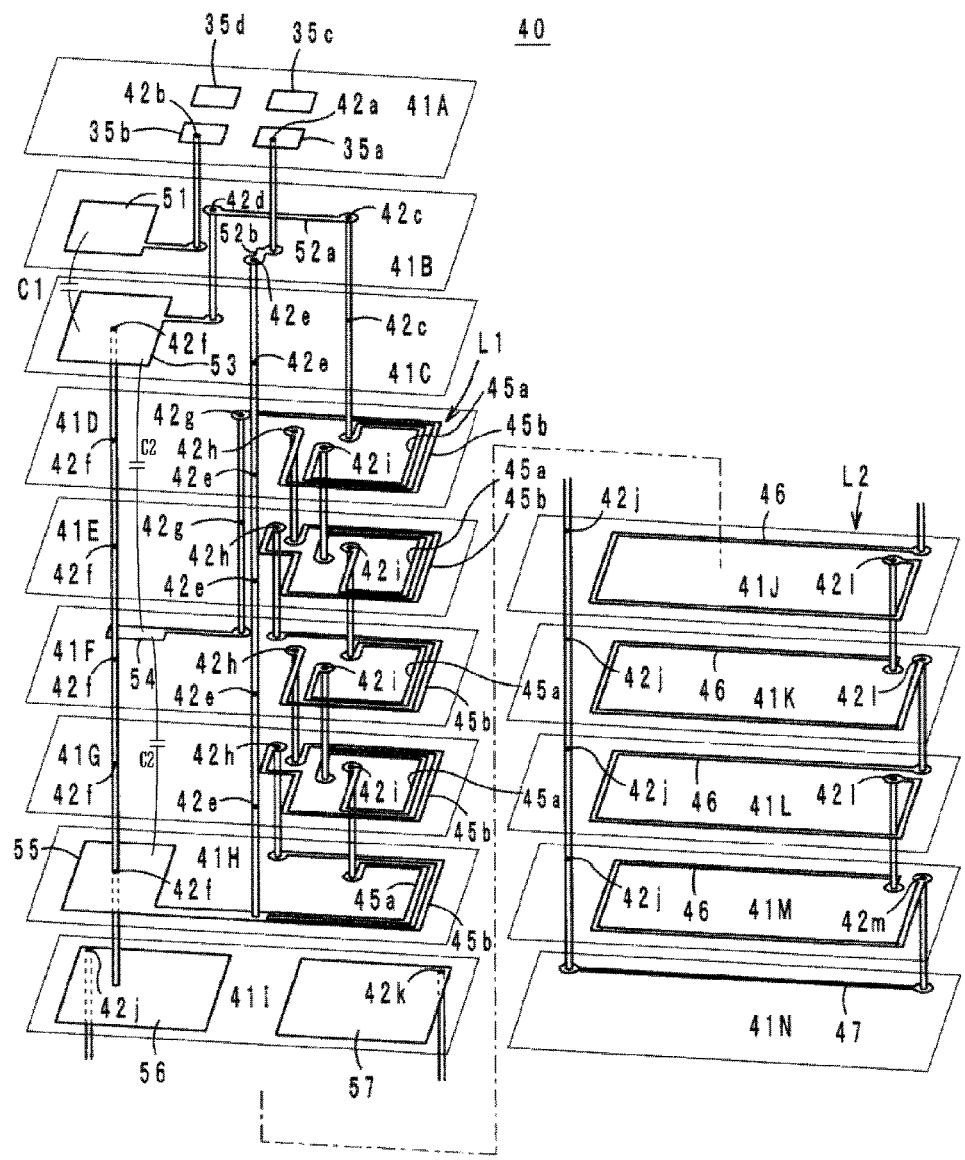
FIG. 5 illustrates a layered structure of the wireless IC device shown in FIG. 3.

FIG. 4 and FIG. 5 illustrate a configuration of the wireless IC device 102. This wireless IC device preferably includes a wireless IC chip 70 that processes a transmission/reception signal of a predetermined frequency and a feeder circuit board 40 on which the wireless IC chip 70 is mounted.

The feeder circuit board 40 is preferably defined by a multilayer board, as shown in FIG. 5, and preferably includes an inductance element L1, an inductance element L2 defining a radiation plate (loop antenna), and capacitance elements C1 and C2.

In detail, the feeder circuit board 40 is preferably made by forming electrodes described below on ceramic sheets 41A to 41N preferably made of a dielectric material, for example, by a well-known method using conductive paste or other suitable material, for example, and then by laminating, bonding and firing these sheets 41A to 41N together.

That is, connection electrodes 35a to 35d and via electrodes 42a and 42b are provided on and through the sheet 41A. A plane electrode 51 (second plane electrode), conductor patterns 52a and 52b, and via electrodes 42c, 42d and 42e are provided on and through the sheet 41B. A plane electrode 53 (third plane electrode) and via electrodes 42c, 42e and 42f are provided on and through the sheet 41C. Conductor patterns 45a and 45b and via electrodes 42e, 42f, 42g, 42h and 42i are provided on and through each of sheets 41D and 41E. A plane electrode 54, conductor patterns 45a and 45b, and via electrodes 42e, 42f, 42h and 42i are provided on and through the sheet 41F.

Further, conductor patterns 45a and 45b and via electrodes 42e, 42f, 42h and 42i are provided on and through the sheet 41G. A plane electrode 55, conductor patterns 45a and 45b, and via electrode 42f are provided on and through the sheet 41H. Plane electrodes 56 and 57 (referring the plane electrode 57 as a first plane electrode) and via electrodes 42j and 42k are provided on and through the sheet 41I. A conductor pattern 46 and via electrodes 42j and 42l are provided on and through each of the sheets 41J to 41L. A conductor pattern 46 and via electrodes 42j and 42m are provided on and through the sheet 41M. A conductor pattern 47 is provided on the sheet 41N.

By laminating the above sheets 41A to 41N together, the conductor patterns 45a and 45b are preferably helically connected by the via electrodes 42h and 42i to define the inductance element L1, and the conductor patterns 46 are preferably helically connected by the via electrodes 42l to define the inductance element L2 (radiation plate). One end of the inductance element L2 is connected to the plane electrode 57 by the via electrode 42k, and the plane electrode 57 faces the inductance element L1. The other end of the inductance element L2 is connected to the plane electrode 56 by the via electrode 42m, the conductor pattern 47, and the via electrode 42j, and is further connected to the plane electrodes 55 and 53 via the via electrode 42f. The plane electrode 53 faces the plane electrode 51 to define the capacitance element C1.

One end of the conductor pattern 45a defining the inductance element L1 is connected to the plane electrode 53 by the via electrode 42c, the conductor pattern 52a and the via electrode 42d, and one end of the conductor pattern 45b is connected to the plane electrode 54 by the via electrode 42g. In addition, the other ends of the conductor patterns 45a and 45b are integrated together on the sheet 41H, are connected to the plane electrode 55, and are further connected to the connection electrode 35a by the via electrodes 42e, the conductor pattern 52b and the via electrode 42a. The plane electrode 51 is connected to the connection electrode 35b by the via electrode 42b.

The connection electrodes 35a and 35b are electrically connected to input and output terminals of the wireless IC chip 70 preferably via metal bumps, for example. The connection electrodes 35c and 35d are preferably terminating ground terminals and are connected to ground terminals of the wireless IC chip 70.

The inductance element L1 is preferably defined by helically arranging a pair of the conductor patterns 45a and 45b parallel or substantially parallel to each other. The line lengths of the pair of the conductor patterns 45a and 45b differ from each other, and thus, different resonant frequencies are obtained, so as to increase the bandwidth of the wireless IC device.

In the wireless IC device 102, since both ends of the inductance element L2 are electromagnetically coupled with a resonant circuit including the inductance element L1, impedance matching between the wireless IC chip 70 and the radiation plate is performed through capacitances Cf between the inductance element L1 and the wiring electrodes thereof, the capacitance C1 between the electrode 51 and the electrode 53, and the capacitances C2 between the electrode 54 and the electrode 53 and between the electrode 54 and the electrode 55. Consequently, variations in the capacitances are small and variations in the frequency characteristic are also small. In addition, regardless of the impedance of the wireless IC chip 70, the size and shape of the radiation plate can be set so as to obtain a predetermined radiation characteristic.

That is, this wireless IC device receives a high-frequency signal radiated from the reader/writer by the radiation plate and causes an LC resonant circuit (in terms of the equivalent circuit, an LC resonant circuit defined by the inductance elements L1 and L2, the capacitance element C1 arranged between the plane electrodes 51 and 53, and the capacitance element C2) to resonate to supply only a reception signal having a predetermined frequency band to the wireless IC chip 70. Meanwhile, predetermined energy is taken from this reception signal, and, by using this energy as a driving source, information stored in the wireless IC chip 70 is matched with a predetermined frequency using the LC resonant circuit, and then the information is transmitted to the reader/writer from the radiation plate.

Incidentally, the resonant frequency of the signal from the radiation plate is preferably set to a value greater than the resonant frequency of the inductance element L1 and the usable frequency of the wireless IC device. Here, the resonant frequency of the signal from the radiation plate means the resonant frequency produced by the inductance element L2 with capacitance elements C1 and C2. By using the radiation plate with a frequency not above the resonant frequency, a magnetic field is generated around the radiation plate, and thus, an electromagnetic wave can be transmitted to a dielectric material, such as resin, for example, at the location at which the wireless IC device 102 is attached. When the electromagnetic wave is radiated to the dielectric material, reflection occurs at a portion where the dielectric constant differs, i.e., between the wireless IC device 102 and the dielectric material, and the wave is transmitted to the outside. Therefore, the wireless IC device 102 can be used in an RFID system by being attached to or embedded in a predetermined surface of the accessory device 202.

In addition, since the first plane electrode 57 connected to one end of the radiation plate is arranged so as to face the inductance element L1, a magnetic field generated at the inductance element L1 is radiated to the plane electrode 57, causing an eddy current in the plane electrode 57. The eddy current flows into the radiation plate to generate a magnetic field in the radiation plate, whereby transmission or reception is performed between the radiation plate and the reader/writer. In this manner, the plane electrode 57 interrupts the magnetic field generated at the inductance element L1. Therefore, configuring the radiation plate into a shape so as to transmit and receive high-frequency signals having a predetermined frequency improves the design flexibility of transmission/reception signals for the wireless IC device. In addition, configuring the plane electrode 57 so as to be larger than the occupancy area of the plane electrode 57 improves the interruption effect of the magnetic field of the inductance element L1, and thus, the design flexibility is further increased so as to improve the radiation characteristic.

Further, since a large capacitance coupling through the capacitance element C1 occurs between the plane electrode 53 connected to the radiation plate and the plane electrode 51, impedance matching of the wireless IC chip 70 with the radiation plate can be performed through the capacitance element C1. Furthermore, since the wireless IC chip 70 is not directly electrically conductive with the radiation plate, damage to the wireless IC chip 70 due to static electricity having an energy wave of about 200 MHz or less entering from the radiation plate is prevented.

Moreover, a stray capacitance Cf is generated between the wiring electrodes defining the inductance element L1. This stray capacitance Cf also affects impedance matching or the resonant frequency. However, by setting the capacitance of the capacitance element C1 defined by the plane electrodes 51 and 53 to a large value, effects of variations in the stray capacitance Cf due to variations in the spacing between the wiring electrodes are reduced, whereby variations in the usable frequency are further reduced.

In addition, since the feeder circuit board 40 is preferably defined by a multilayer board, the inductance element L1 and the inductance element L2 can be provided on layers inside the multilayer board, whereby the size of the feeder circuit board 40 is reduced.

Note that although in the arrangement shown in FIG. 5, the plane electrode 53 connected to the radiation plate and the plane electrode 51 are preferably capacitively coupled, both plane electrodes may, alternatively, be directly electrically conductive with each other. In such a case, impedance matching is performed through the inductance element L1 and the stray capacitance Cf between the wiring electrodes.

Figure 6A:
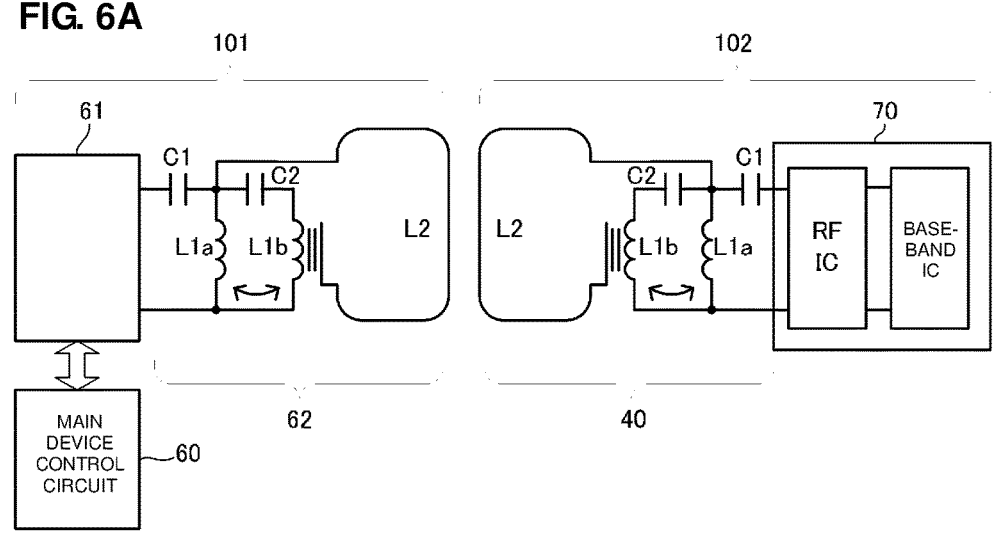
FIGS. 6A and 6B are an equivalent circuit diagram of the wireless IC device system having the wireless IC device shown in FIG. 3 and a reflection characteristic diagram of the wireless IC device shown in FIG. 3.
Figure 6B:
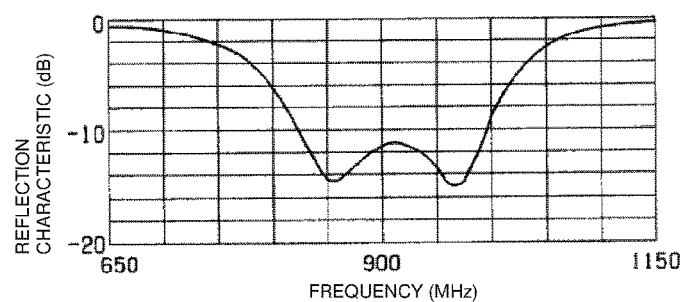

Next, an equivalent circuit of the wireless IC device system including a wireless IC device described above and a reflection characteristic of the wireless IC device are shown in FIGS. 6A and 6B.

In the equivalent circuit shown in FIG. 6A, two inductance elements L1$a$ and L1$b$ provided in the feeder circuit board 40 of the wireless IC device 102 correspond to the inductance element L1 shown in FIG. 5. These two inductance elements L1$a$ and L1$b$ preferably have different inductance values and, thus, peaks occur at respective resonant frequencies, whereby the reflection characteristic in which the band of the usable frequency is widened, as shown in FIG. 6B, is obtained.

The wireless IC chip 70 preferably includes a radio frequency IC (RFIC) in which a high-frequency circuit is provided and a baseband IC in which a logic circuit is provided.

Similarly, the reader/writer 101 preferably includes a feeder circuit board 62. The feeder circuit board 62 has a similar configuration to the feeder circuit board 40 of the wireless IC device 102, whereby a wideband characteristic is achieved. A reader/writer control circuit 61 preferably includes, as in the case with the wireless IC chip 70 of the wireless IC device 102, an RFIC in which a high-frequency circuit is provided and a baseband IC in which a logic circuit is provided. A main device control circuit 60 controls the reader/writer 101, and also reads the identification code of the wireless IC device 102 and performs a process based on the result.

Note that, if a UHF band is used, communication is preferably performed by a radiation electromagnetic field method, that is, by transmission and reception of electromagnetic waves. If an HF band is used, communication is preferably performed by an electromagnetic coupling method, that is, by transmission and reception of magnetic field signals.

Figure 8A:
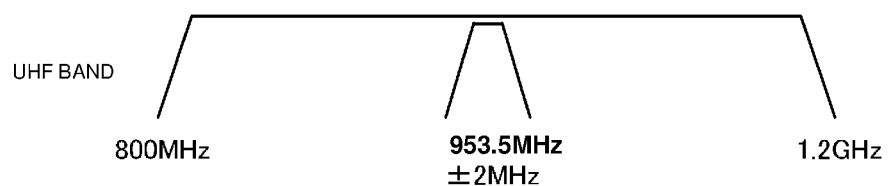
FIGS. 8A and 8B illustrate frequency bands for signals with which the wireless IC device and the reader/writer shown in FIG. 6A communicate.
Figure 8B:
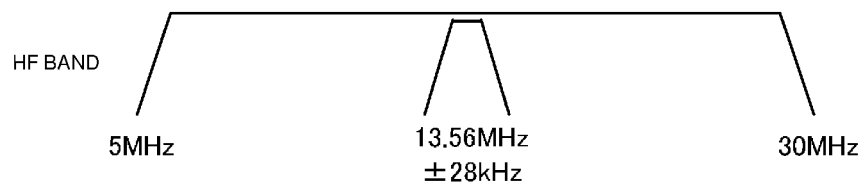

FIGS. 8A and 8B are diagrams illustrating frequency bands for signals with which the wireless IC device 102 and the reader/writer 101 communicate. Where the wireless IC device 102 is used as an RFID tag for a UHF band, the frequency band is preferably set so as to obtain a gain over a wide band from about 800 MHz to 1.2 GHz, for example, as shown in FIG. 8A. Where the wireless IC device 102 is used as an RFID tag for an HF band, the frequency band is preferably set so as to obtain a gain over a wide band from about 5 MHz to about 30 MHz, for example, as shown in FIG. 8B.

Part 3 and Part 6 of ISO/IEC 18000 respectively define the RFID air interface at about 13.56 MHz and that at UHF band frequencies. For the UHF band, about 953.5 MHz±2 MHz is used in Japan, about 866.6 KHz±1 MHz is used in Europe, and about 915 MHz±13 MHz is used in the U.S.

Thus, it is sufficient to have a maximum frequency band of about ±20 MHz for communication signals used by RFID tags for the UHF band. For a normal RFID tag supporting only conventional predetermined frequencies, the frequency band can be achieved by using, for example, an antenna having the dimensions of about 5 nm×about 5 nm. For a counterfeit RFID tag, a configuration is provided such that communication is possible in a band of, for example, about 953.5 MHz±2 MHz, or a configuration is provided such that communication is possible in a band of, for example, about 13.56 MHz±28 kHz. On the other hand, the wireless IC device 102 for a real RFID tag can communicate over a wide band from about 800 MHz to about 1.2 GHz, for example. In addition, the same wireless IC device for the RFID tag can be used around the world without modification, and thus, there is no need to tune the wireless IC device to a frequency for each shipment destination, whereby the cost of the wireless IC device is significantly reduced.

Note that, when, for example, video game software is placed in a video game machine, the distance between the interrogator and the RFID tag is approximately a few millimeters. Since communication is performed across such a small distance, a radio used in the RFID tag may be a specified low power radio of about 10 mW or less. Therefore, authenticity determination is enabled in communication in which a limitation of frequency band is not necessary.

Furthermore, since both of the wireless IC device for the RFID tag and the interrogator according to a preferred embodiment of the present invention can be used over a wide band and applied around the world without modification, when authenticity determination is performed using a frequency band that is not used in a certain area, a frequency at which a counterfeit RFID tag can communicate is not inadvertently selected, and thus, more secured authenticity determination can be performed.

For example, communication may be performed using a frequency in the frequency band of about 866.6 KHz±1 MHz used in Europe or using a frequency in the frequency band of about 915 MHz±13 MHz used in the U.S., other than the frequency band of about 953.5 MHz±2 MHz assigned for RFID tags used in Japan, to perform authenticity determination by determining whether or not the communication has been successful.

FIG. 7 is a flowchart illustrating a processing procedure of the main device control circuit 60 shown in FIG. 6A.

First, a mounting state of the accessory device 202 is detected (S1). This is performed by, for example, reading the state of an accessory device mounting state detection switch provided on an accessory device mounting section of the main device 201.

When the accessory device is mounted, a variable N for counting the number of repetitions, which will be described later, is initialized (S2), and a random number is generated (S3). Then, a carrier frequency corresponding to the generated random number is determined (S4). For an RFID tag using a UHF band, the frequency band from about 800 MHz to about 1.2 GHz is divided into channels preferably having a band width, for example, of about ±5 MHz, as shown in FIG. 8A, and thus, the selection of 40 channels ((1200−800)/10=40 channels) are available, and an interrogation signal is transmitted from the reader/writer at the carrier frequency of one of the 40 channels in accordance with the random number (S5). For an RFID tag using an HF band, the frequency band from about 5 MHz to about 30 MHz is divided into channels preferably having a band width, for example, of about ±28 kHz, as shown in FIG. 8B. In this manner, the reader/writer 101 attempts to communicate with the wireless IC device 102 at a communication frequency which has been randomly selected.

Although frequencies of 40 channels are preferably used as described above, it is sufficient to use frequencies of at least 5 channels. That is, a frequency band in which an authentic wireless IC device can communicate is preferably not less than approximately five times the carrier frequency band of communication signals used in RFID tags. With this configuration, at least five counterfeit RFID tags, each having a different communication frequency, must be provided on a counterfeit accessory device, and this is not realistic. Therefore, a deterrent effect on counterfeit tags is effective.

A response signal from the wireless IC device (RFID tag) 102, if any, is received and a determination is made as to whether or not the response signal is a correct identification code (S6 to S7). If the identification code is normal, the counter N value is incremented by one, and then the processes from steps S3 to S9 are repeated (S8 to S9 to S3 . . . ).

The processes described above are repeated five times, that is, if the wireless IC device can perform communication in response to interrogation signals of all five different carrier frequencies and normal identification codes are replied, then normal processes are initiated (S8 to S10). Although switching is preferably performed among five frequency bands, for example, the determination may be made as to whether or not communication is possible with at least two different frequencies.

If normal identification codes are not replied in the communication with five different carrier frequencies, it is determined that the wireless IC device provided on the accessory device is counterfeit, that is the accessory device is counterfeit, and a warning is provided to the user. For example, a warning sound is made or a warning display is provided to indicate that the accessory device is counterfeit (S7 to S11).

After that, the power supply of the main device is interrupted and the processing is completed (S12). In this manner, mounting of a counterfeit accessory device is effectively and accurately detected and operations using the counterfeit accessory device are prevented.

Note that although in the preferred embodiment described above, when a counterfeit accessory device is mounted or about to be mounted, a warning is generated and then the power supply of the main device is interrupted to terminate the operation completely, for example, the main device may enter a limited operation mode, such as a mode in which an operation that uses an accessory device is disabled.

In the preferred embodiment described above, a band from about 800 MHz to about 1.2 GHz, for example, is preferably supported since an RFID tag using a UHF band is used. However, from a practical standpoint, communication over a wider band from about 800 MHz to approximately about 5 GHz is possible. In such a case, (5000−800)/10=420 channels are available, if the frequency band of communication signals of RFID tags is about 10 MHz, or (5000−800)/4=1050 channels are available, if the frequency band of communication signals is about 4 MHz. Consequently, a frequency band in which communication is possible for an authentic wireless IC device is preferably less than approximately 1000 times the carrier frequency band of communication signals used in RFID tags, for example.

As described above, according to a preferred embodiment of the present invention, fabrication can be preventing by the following two major barriers.

First, even when analysis of the wireless IC device for the authentic RFID tag according to a preferred embodiment of the present invention is attempted for fabrication, it is extremely difficult to perform the analysis by detecting a communication signal using digital technology since the frequency of an interrogation signal from the reader/writer is not constant. This is the first barrier.

In addition, even if the encryption algorithm or the identification code is analyzed by analyzing the bit pattern of the IC chip and the bit pattern is duplicated, the analysis and duplication are successful only for a baseband portion. Since the frequency band in which communication is possible for a counterfeit RFID tag should have been set to a preliminarily standardized frequency band, it is impossible to respond to an interrogation signal of frequencies in a wide band without modification. This is the second barrier.

Note that, the main device 201 preferably including the reader/writer 101 is described above. However, only a reader (interrogator) may be provided when there is no need to write data to a memory in the wireless IC device for an RFID tag.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A method for determining authenticity of a wireless IC device in a system including the wireless IC device that is used as an RFID tag and an interrogator that communicates with the wireless IC device, the wireless IC device including a wideband impedance matching circuit and is configured to be capable of, by itself, processing signals having a plurality of frequencies in a widened frequency band that is wider than a frequency band of communication signals used by a standard RFID tag;

wherein the wideband impedance matching circuit comprises at least two helical inductors formed by conductive patterns on each of a plurality of substrate sheets, the conductive patterns of each sheet interconnected with the conductive patterns of the other sheets, the sheets laminated to form a multilayer circuit board;

the method comprising the steps of:
transmitting a first signal from the interrogator to the wireless IC device at a first frequency which is randomly selected, using the interrogator, within the widened frequency band that is established by the wideband impedance matching circuit;
transmitting a second signal from the interrogator to the wireless IC device at a second frequency which is randomly selected, using the interrogator, within the widened frequency band, the second frequency being different from the first frequency;
determining whether or not communication with the wireless IC device is possible at the first frequency and the second frequency; and
determining that the wireless IC device is authentic if communication is possible at both the first frequency and the second frequency.

2. The method for determining authenticity of the wireless IC device according to claim 1, wherein the interrogator selects two or more frequencies at which communication is to be performed.

3. The method for determining authenticity of the wireless IC device according to claim 1, wherein the widened frequency band in which the wireless IC device is capable of performing communication is in a range from 5 times or more to less than 1000 times the frequency band of the communication signals used by the standard RFID tag.

4. The method for determining authenticity of the wireless IC device according to claim 1, wherein the wireless IC device includes only a single wireless IC chip and only a single feeder circuit board on which the single wireless IC chip is mounted.

* * * * *